United States Patent [19]

Jacobson

[11] 3,781,880
[45] Dec. 25, 1973

[54] AREA NAVIGATION SYSTEM
[75] Inventor: Robert S. Jacobson, Phoenix, Ariz.
[73] Assignee: Sperry Rand Corporation, New York, N.Y.
[22] Filed: Apr. 5, 1971
[21] Appl. No.: 131,013

[52] U.S. Cl............ 343/6 R, 343/106 R, 343/106 D
[51] Int. Cl................................................. G01s 9/02
[58] Field of Search................ 235/150.27; 343/6 R, 343/112 C, 112 D, 106 R, 106 D

[56] References Cited
UNITED STATES PATENTS
3,173,140  3/1965  Hansel............................ 343/106 D
3,430,243  2/1969  Evans.............................. 343/112 D
3,453,624  7/1969  Rockey........................... 343/112 C
2,664,560  12/1953  Lyman et al...................... 343/6 R
3,075,190  1/1963  Laporte.......................... 235/150.27

Primary Examiner—Benjamin A. Borchelt
Assistant Examiner—Denis H. McCabe
Attorney—S. C. Yeaton

[57] ABSTRACT

An apparatus permitting area navigation employs radio distance measuring equipment transmissions and omni-range radio transmissions from a guidance transmitter system for craft-borne employment of magnetic azimuth and actual ground range of the craft with respect to the guidance transmitter location.

2 Claims, 10 Drawing Figures

PATENTED DEC 25 1973 3,781,880

INVENTOR
ROBERT S. JACOBSON
BY
H.P. Terry
ATTORNEY

AREA NAVIGATION SYSTEM

BACKGROUND OF THE INVENTION

1. Field of the Invention

The invention pertains to radio receiver and communication apparatus for permitting accurate navigation of craft and more particularly relates to improvements in radio navigation distance measuring and omni-range receiver systems for permitting craft-borne display or other utilization of magnetic azimuth and actual ground range of a craft with respect to conventional navigation transmitters, thereby permitting accurate and reliable areas navigation of the craft with respect to such conventional guidance transmitters and to conventional radio courses defined thereby.

2. Description of the Prior Art

Generally, it has been the past practice to restrict aircraft flight only to those paths lying substantially directly between radio range or guidance stations. With expanding air traffic volume, the consequent excessive crowding of these radio defined air routes, especially at altitudes where favorable winds are likely to exist, has become a serious problem. Accordingly, it would be desirable to permit aircraft to fly following other courses, preferably still employing the general types of radio navigation equipment in current usage, or modified versions thereof. Such courses might be generally parallel to original radio defined courses or in other arbitrary directions.

The prior art has not made available a fully satisfactory means for accurately calculating, for instance, straight or other flight paths between points other than those at which radio range stations are located. Such as desirable system would permit the use of what may be termed area navigation, as opposed to navigation where flight courses are rather strictly bound to radio defined courses. Existing equipment concepts do not permit use in a satisfactory manner of the area navigation technique.

SUMMARY OF THE INVENTION

The present invention pertains to radio communication and receiver apparatus for accurate and reliable area navigation of craft with respect to established distance measurement and omni-range transmitter stations, as well as long established courses commonly defined by such stations. In the craft-borne receiver system, the fractional amplitude modulation of the received omni-range transmissions is abstracted and is used to modify the radio derived slant range values as conventionally derived from craft-borne distance measuring equipment so as to yield actual ground range. Knowledge and use of accurate ground range data permits precise areas navigation of the craft.

DESCRIPTION OF THE PREFERRED EMBODIMENTS

Figure 1:
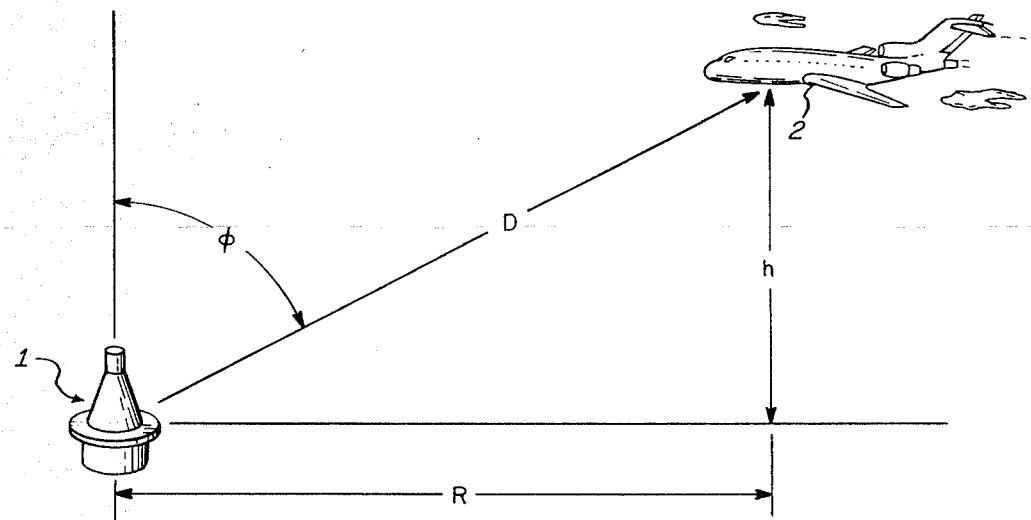
FIG. 1 is an elevation view of a navigation situation useful in defining terms employed in discussion of the invention when operating in a first mode.

According to the present invention, implementation of the area navigation technique is afforded by employing information already inherently present in the transmissions of existing radio navigation or guidance transmitters, including the existing radio distance measuring equipment and very high frequency omni-range equipment. These radio navigation devices enable the pilot of an aircraft to determine both its range and bearing relative to the radio navigation transmitter by means of two separate receivers conventionally employed within the aircraft. The distance measuring equipment, as is well known in the art, employs an interrogator element for computing slant range to the ground guidance transmitter by well known pulse transponder techniques. On the other hand, the conventional very high frequency omni-range receiver in the aircraft is arranged to compute the magnetic bearing of the aircraft with respect to the ground station transmitter. This result is accomplished by phase comparison in the airborne receiver of two 30 Hertz signal modulations of energy radiated from the ground omni-range transmitter.

In flight along conventional radio defined courses, the actual location of the ground transmitters to which the airborne equipment is tuned is known. It is therefore possible to determine, according to established methods, the location of an aircraft by observation of the slant range and bearing values displayed by the omni-range and distance measurement indicators. As long as the aircraft is flying substantially to or from the cooperating guidance station, the error introduced by the fact that the distance measurement equipment assesses slant range instead of actual ground range is not of particular consequence. Such comes about because the navigation and reporting check points and selected to be substantially directly over the guidance stations. Also, the error can be tolerated as far as proper aircraft operation is concerned because two aircraft at the same range are subject to substantially the same geometrical errors.

While such errors may be tolerated for substantially on-course radio navigation, they become prohibitive if area navigation is attempted with existing equipment. Such errors then make the computation of position for both reporting and operating purposes generally unreliable and even useless. It is seen that ground range, rather than the slant range values conventionally found by the distance measurement equipment, must be used whenever the altitude of the aircraft relative to the guidance station becomes a significant fraction of its range from the station. Otherwise, serious errors will generally result. For example, in environments in commercial flight in which altitudes of 40,000 feet are routine, the data would be highly erroneous for a very large portion of the flight time. It has been observed that elimination of the slant range error and its attendant complex compensating features is a prerequisite to the development of optimum flight routes and separation criteria. However, compensation for the slant range error, as noted above, has in the past been particularly complex and time consuming.

One such prior method of compensating for slant range error has included a series of steps, each of which may individually inject error into the calculation. First, the aircraft pressure altitude referred to sea level must be measured with a precision barometric device. Next, this quantity must be converted to density altitude by compensation for local ambient pressure. This latter step may require radio contact with a local ground radio communication station, if indeed a truly local station is available, receiving a voice correction, and manually inserting the correction into the equipment. One must subtract the altitude of the ground radio communication station, which may involve consultation of charts or of a computer memory so as to obtain the actual altitude of the aircraft above the station. Finally, the right triangle must be solved by utilizing the relation that the square of the ground range is equal to the square of the slant range as displayed by the distance measuring receiver display minus the square of the corrected altitude as computed in the foregoing steps.

While it is apparent that such a multi-step method of computation of actual ground range using the radio-provided slant data can be reasonably accurate, it is complicated and expensive and if done using mostly manual steps, is inordinately time comsuming. In addition to performing the actual computation, an accurate barometric altitude sensor must be available on the aircraft, the elevation of the ground guidance transmitter station must be remembered, and correction factors for local ambient pressure must be ascertained.

According to the present invention, the desired ground range value R illustrated in FIG. 1 is derived directly and in a simple manner from the guidance information supplied by the distance measurement and omni-range transmitter system 1 without the use of additional information relative to altitude or other factors derived within the aircraft or from cooperating communication systems. In FIG. 1, there is represented at the origin of the coordinate system an omni-range distance measuring ground transmitter equipment 1 supplying conventional radio navigation signals to receiver equipment within aircraft 2. As seen in FIG. 1, the slant range D is a function of the ground range R for aircraft 2 at an arbitrary altitude h. It is observed that the vector representing the slant range D makes an angle $\phi$ with the zenith. Conventional distance measuring receiver equipment within aircraft 2 measures the slant range D to transmitter station 1. To measure ground range R, it is evident that one may employ the trigonometric relationship $R = D \sin \phi$.

Figure 2:
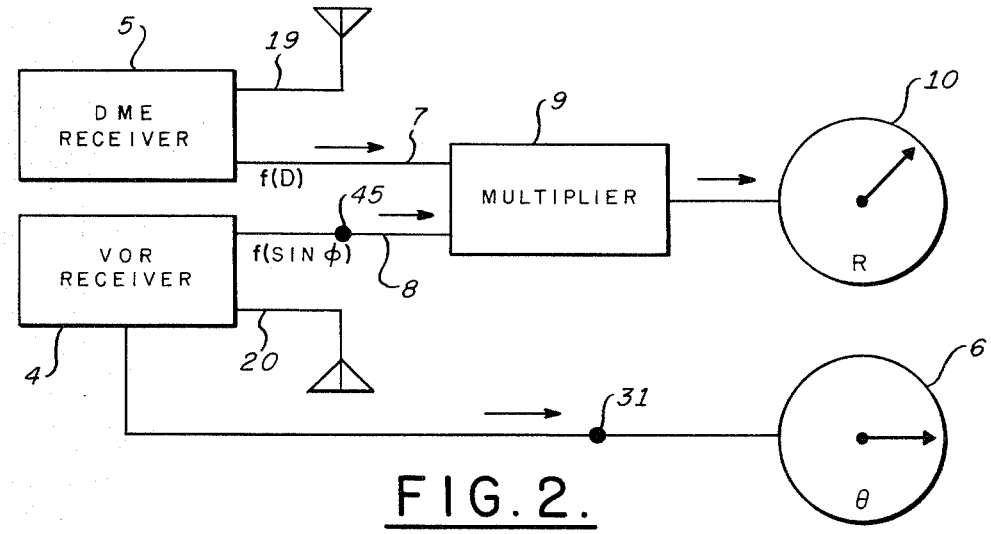
FIG. 2 is a schematic diagram of the novel navigation system.

Referring to FIGS. 1 and 2, the conventional airborne amni-range receiver 4 normally employs signals collected by antenna 20 to measure only the aircraft azimuth bearing angle $\theta$ with respect to transmitter station 1. A signal representing the angle $\theta$ is directly supplied to a utilization device such as the display schematically represented by electrical meter 6, which meter may take any of various forms. According to the present invention, the very high frequency omni-range receiver 4 is modified in such a manner that it provides a measure of sin $\phi$ on its output lead 8. The distance measurement equipment receiver 5 uses signals collected by antenna 19 to provide, in the conventional manner, a measure of slant range D on output lead 7.

Thus, computation of D sin $\phi$ and therefore of ground range R is accomplished by supplying measures of or proportional to the quantities D and sin $\phi$ to the inputs of a simple multiplier device 9. Multiplier device 9 can generally be of analog, digital, or hybrid type, and may be selected from a variety of available multiplier elements. Thus, a signal representing actual ground range R between the aircraft 2 and the ground guidance transmitter station 1 may be applied to a utilization device such as a control system or an electrical meter 10, which meter may be a display similar to that of display 6.

Means for deriving a measure of the value sin $\phi$ within the omni-range receiver 4 are next to be discussed. The generation of this information can best be understood by examining the nature of the radiations from the very high frequency omni-range station 1. First, it must be observed that there are two types of very high frequency omni-range guidance systems. One is normally called the conventional very high frequency omni-range system and the other the Doppler very high frequency omni-range system. It is important to distinguish these two types of equipment and their radiations, for the process of extraction of a measure of the value of $\phi$ differs for the two different equipments. It will further be understood that an objective of the present invention is to afford a simple, inexpensive, and convenient means for the rapid recovery of a measure of the value of sin $\phi$ from the radiations of either type of guidance system.

Figure 3:
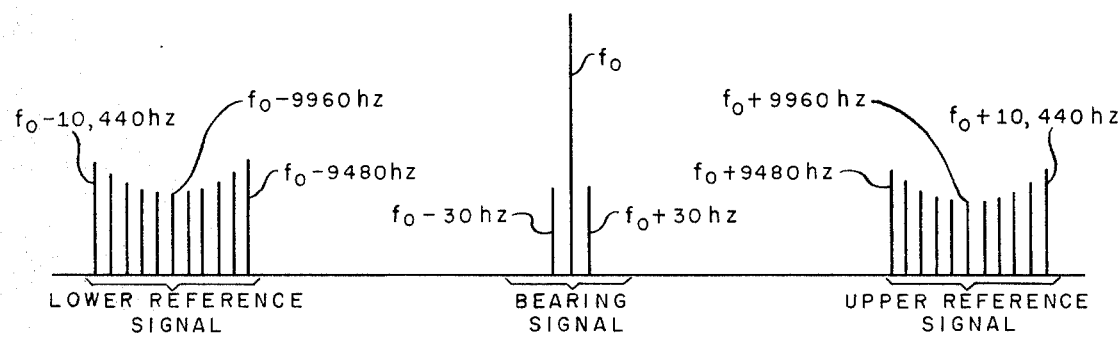
FIG. 3 is a graph showing the spectrum of radio frequency transmissions employed in the invention.

First to be discussed in connection with FIGS. 3 and 4 will be the elements for extracting a measure proportional to the value sin $\phi$ from conventional very high frequency omni-range transmissions within a modified omni-range receiver. While a lengthy analysis of the characteristic of these transmissions could readily be supplied herein, it will suffice to refer to such an analysis contained in Chapter 9 of "Electronic Avigation Engineering" by Peter C. Sandretto, published by International Telephone and Telegraph Corporation in 1958. Chapter 9 of this text, commencing on page 373, describes such very high frequency phase comparison omni-directional radio range systems. In this text, Sandretto shows that the very high frequency omni-range transmitter radiates a composite signal with a reference tone modulation as a 30 Hertz frequency modulation of a pair of 9,960 Hertz amplitude modulated side bands and an azimuth bearing tone modulation as 30 Hertz amplitude modulated side bands about the main carrier frequency $f_0$. As seen in FIG. 3, the relative phase of the bearing tone and the reference tone varies directly as the magnetic bearing of the aircraft changes with respect to the guidance transmitter 1. Accordingly, in the conventional omni-range receiver as in the present invention, separate amplitude and frequency modulation detectors are employed for the purpose of separating these two 30 Hertz tones. Accordingly, they are separated, detected, and compared in phase to determine aircraft magnetic bearing. FIG. 3 illustrates the wide separation from the bearing signals of the lower and upper reference modulation signals. This factor, in addition to the factor that the modulations are inherently dissimilar because of their respective amplitude and frequency modulation characteristics, makes the two 30 Hertz signals relatively simple to separate in a conventional receiver.

Sandretto's discussion of the Civil Aeronautics Administration transmitter and transmitter antenna system begins on page 379 of his text and provides an analysis that results in an equation for the field strength $E_T$ of the omni-range bearing signal. This equation is:

$$E_T = -K \sin \phi \, [1 - I_r/I_v \, (PSH/h \sin \phi) \cos (\omega_s t - \theta)]$$

Where:
- $K$ = includes a radio frequency carrier term and terms associated with slant range $D$, atmospheric propagation conditions, and the like.
- $\phi$ = zenith angle, as defined above,
- $I_r$ = current in the central loop of an antenna of the ground transmitter antenna complex,
- $I_v$ = current in coplanar loops of the ground transmitter antenna complex,
- $P = 2\pi/\lambda$, where $\lambda$ is carrier wave length,
- $S$ = spacing between coplanar loop centers in the ground transmitter antenna complex,
- $H$ = height of the center loop above the counterpoise in the ground transmitter antenna complex,
- $\omega_s$ = radian modulation frequency or $2\pi$ times 30 Hertz, and
- $\theta$ = aircraft bearing angle, as defined above.

The bove equation is Sandretto's equation 9.22, and inspection of it betrays the fact that the actual field strength varies directly as $\sin \phi$ or in proportion to $\sin \phi$. However, the parameter $K$ is not actually a constant in the sense that it evidently contains many variables over which the designer of utilization equipment has no control. Thus, it is futile to attempt to use the quantity $K \sin \phi$ to generate a measure of $\sin \phi$.

Further inspection of Sandretto's equation 9.22 shows a term:

$$I_r/I_v \, (PSH/h) \sin \phi$$

involving $\sin \phi$ and amplitude values which are in fact stable and known. It is practical in the operation of ground omni-range transmitter stations to hold the value of the quantity $$I_r/I_v \, (PSH/h)$$

constant, such as very closely to a value of 0.30. Thus, the term $$I_r/I_v \, (PSH/h) \sin \phi$$

is the fractional amplitude modulation of the 30 Hertz tone on the main carrier signal $f_0$. This fractional amplitude modulation will vary from zero to a maximum value of 0.30 with variation in $\sin \phi$. For example, when the aircraft is directly over the omni-range station ($\phi = 0°$ and $\sin \phi = 0$), the value of the fractional amplitude modulation is zero. When the aircraft is at a 60° elevation angle with respect to the ground omni-range transmitter station ($\phi = 30°$ and $\sin \phi = 0.500$), the value of the fractional amplitude modulation is 0.150. When the aircraft is at a 30° elevation angle ($\phi = 60°$, $\sin \phi = 0.866$), the received fractional amplitude modulation is 0.260, and so on. As seen in FIG. 3, this measurement amounts to a measurement of the amplitude of the 30 Hertz amplitude modulation azimuth bearing side bands relative to the carrier amplitude. It will be understood that the derivation of Sandretto's equation for $E_T$ includes the assumption that the spacing between elements of the five loop Alford antenna system is small. This permits, in his derivation, sines of certain angles to be equated to the actual angles, simplifying the derivation. In general, the spacing between antenna elements of the five loop Alford antenna system will be small compared to the operating wave length for the transmitter, as is well established in practice in such transmitters.

Figure 4:
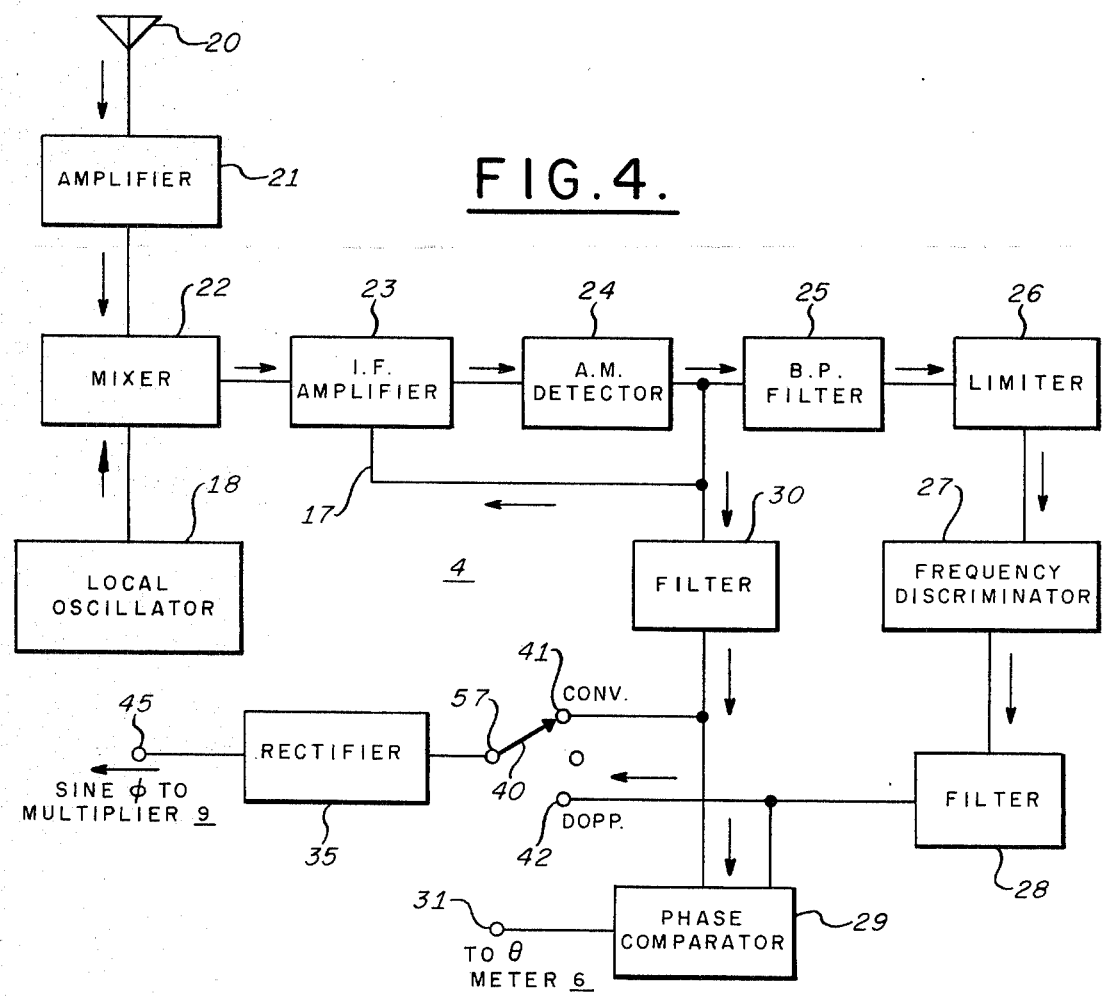
FIG. 4 is a block diagram of a navigation receiver according to the present invention.

FIG. 4 illustrates a very high frequency omni-range heterodyne receiver 4 adapted to accomplish the desired purpose; many of the elements of the receiver circuit are those used in conventional practice in omni-range receivers. Here, conventional omni-range airborne antenna 20 collects and supplies the omni-range signals to a preamplifier 21. The latter device, as in standard practice, raises the incoming omni-range signals to a level appropriate for proper mixing in mixer 22 with a local oscillator signal generated by oscillator 18. The intermediate frequency signal generated by this operation in mixer 22 is applied to intermediate frequency amplifier 23 and is fed to amplitude modulation detector 24 for the detection of the aforementioned amplitude modulation components of the omni-range transmissions. The detected output of circuit 24 may be coupled back by electrical lead 17 for control purposes within intermediate frequency amplifier 23.

In the conventional receiver, the output of amplitude modulation detector 24 is additionally supplied to band pass filter 25. In ordinary practice, filter 25 has a pass band including 9,000 to 11,000 Hertz. Signals passed to limiter 26 are then supplied in the conventional manner to frequency modulation detector or frequency discriminator 27, whose operating frequency is centered at 9,960 Hertz. The 30 Hertz output of discriminator 27 is supplied through a 30 Hertz filter 28 as one input to a conventional 30 Hertz phase comparator 29. The other input to phase comparator 29 is supplied as in the normal practice, from the output of amplifier modulation detector 24 through a second 30 Hertz filter 30. Thus, the 30 Hertz signals derived from amplitude modulation detector 24 and frequency discriminator 27 are compared by phase detector 29 to yield a measure of the magnetic bearing of aircraft 2 with respect to the guidance transmitter station 1 at terminal 31. Terminal 31 is recognized in FIG. 2 as the input terminal 31 of azimuth bearing meter 6.

As noted previously, the components of the receiver thus far described are those of the conventional very high frequency omni-range receiver. Assuming that the automatic gain control signal supplied on lead 17 to intermediate frequency amplifier 23 is of proper quality to hold the detected carrier at the output of amplitude modulation detector 24 constant, a useful signal for the purpose of the invention may be derived at the output of the 30 Hertz filter 30 and will give an accurate measurement of the modulation percentage and hence of the desired measure of the value of $\sin \phi$ for driving multiplier 9 of FIG. 2. In employment with conventional omni-range transmissions, the output filter 30 is therefore permitted by switch 40 to supply a signal directly to precision rectifier 35. The desired signal proportional to $\sin \phi$ therefore appears on the output terminal 45 of precision rectifier 35.

Figure 6:
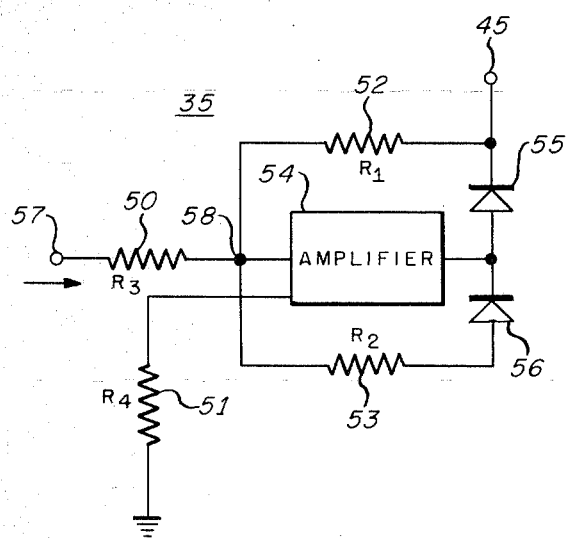
FIG. 6 is a wiring diagram of a circuit employed in FIG. 4.

FIG. 6 represents one form which the precision rectifier 35 may take. The circuit of FIG. 6 has high stability and linearity, its characteristics depending almost entirely upon stable and passive circuit elements. The output from switch 40 is fed via input terminal 57 through resistor 50 and then directly to operational amplifier 54. A second input to amplifier 54 is grounded through resistor 51. The output of operational amplifier 54 is applied through diodes 55 and 56, poled as illustrated in the drawing, to the respective feed back resistors 52 and 53. The signals traversing resistors 52 and 53 are coupled at junction 58 to the input of amplifier 54. The useful output of the precision rectifier 35 is fed via terminal 45 to multiplier 9.

Amplifier 54 may have a high gain of the order of 10,000 to 100,000. The resistance values $R_1$ and $R_2$ of resistors 52 and 53 may both be 10,000 ohms, for example, while the resistance $R_3$ of resistor 50 may be 2,000 ohms. The resistance $R_4$ of resistor 51 is not particularly critical.

As is well known, the over all gain characteristic of the circuit of FIG. 6 is:

$$G = A/(1 - A\beta)$$

where $A$ is the unmodified or open loop amplifier gain and $\beta$ is the feed back network transfer function. Thus, if the gain A is very large, the product $A\beta$, is large compared to unity and the expression reduces to:

$$G = -1/\beta.$$

Figure 7:
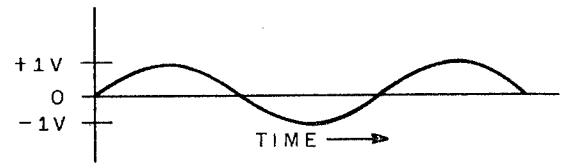
FIGS. 7, 8 and 9 are graphs of wave forms useful in explaining the operation of the circuit of FIG. 6.
Figure 8:
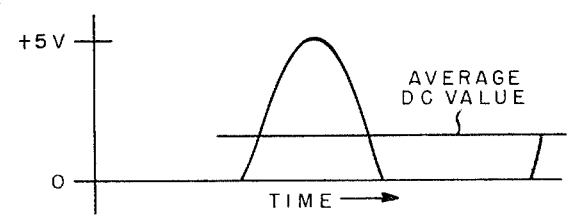
Figure 9:
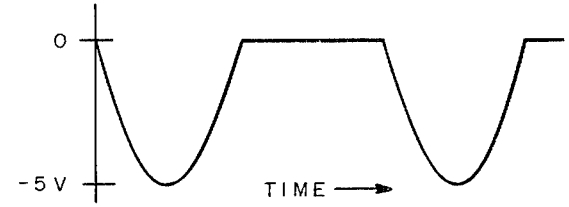

The value of $\beta$ in the arrangement being discussed is 0.2 ($\beta = R_3/R_1 = R_3/R_2 = 0.2$). FIG. 7 represents the input sine wave signal placed on terminal 57, FIG. 8 the half-wave rectified output on terminal 45, and FIG. 9 the signal on the lead between resistor 53 and diode 56. In operation, the precision rectifier 35 employs the operational amplifier 54 and a rectifier diode in the feed back path, thus reducing the effects of diode forward voltage drop and non-linearities because of the high forward open loop gain of amplifier 54.

As stated previously, the above described receiver system is tailored for operation with conventional omni-range transmissions. It will now be shown that it may be employed to perform its useful function also with Doppler omni-range transmissions. It is a known characteristic of the Doppler guidance system that the transmissions thereof have certain similarity to those of the conventional omni-range transmissions. In the Doppler omni-range system, the modulations are reversed in that the 30 Hertz amplitude modulation about the carrier frequency $f_0$ represents the reference tone and the 30 Hertz frequency modulation placed on the 9,960 Hertz subcarrier signal is the azimuth bearing tone. The conventional omni-range receiver operates in a perfectly normal manner with these Doppler omni-range transmissions, since it merely measures the relative phases of the reference and bearing tones. It is therefore not affected by the type of ground guidance station employed. However, the percentage modulation of the 30 Hertz amplitude modulation signal no longer varies with sin $\phi$ when the receiver is tuned to a Doppler omni-range system.

There are several sources available in the literature which describe in detail the operation of the Doppler very high frequency omni-range system. One of these is "Avionics Navigation Systems" by Kayton and Fried, published by John Wiley and Sons in 1969. Particular reference may be had to pages 168 and 169 of the Kayton et al. book. This text and others describe the operation of well known types of Doppler very high frequency omni-range systems. Generally, these systems operate by using a guidance transmitter with an electrically commutated antenna complex that moves about a horizontal circular path or relatively large diameter, for example, rotating at 30 revolutions per second to produce the desired 30 Hertz frequency modulation of the 9,960 Hertz side band. As is well known, the amount of frequency modulation appearing in the radiated signal is proportional to the apparent velocity of the antenna with respect to the cooperating receiver, the modulation being formed because of the Doppler effect. In conventional practice, the radiating antenna moves in the horizontal plane so that the full velocity component of the antenna is seen by the aircraft receiver only when lying in the horizontal plane of the antenna. Evidently, the velocity component seen by an aircraft receiver above that horizontal plane will be correspondingly reduced.

Figure 5:
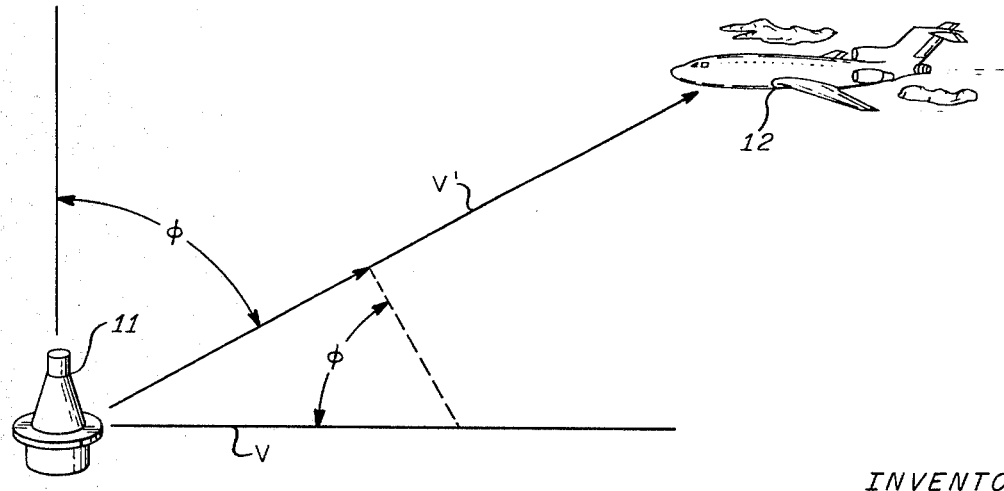
FIG. 5 is a view similar to FIG. 1 useful in explaining operation of the invention in a second mode.

FIG. 5 represents the situation in which the length of the velocity component or vector V' along the line between the aircraft 12 and the ground transmitter station 11 will vary as sin $\phi$, where $\phi$ is the angle between that line and the zenith. As the velocity component V' varies, then so must also vary the modulation index of the 30 Hertz frequency modulation on the 9.960 Hertz side band. For example, if aircraft 12 is at the lowest possible elevation angle (where $\phi$ is 90°), its omni-range receiver will detect a modulation on the side band which varies in instantaneous frequency from a low, for example, of 9,480 Hertz to a high of 10,440 Hertz, or 9,960 ± 480 Hertz. If aircraft 12 is at a 30° elevation angle such that $\phi$ equals 60°, the modulation will vary from a low of 9,545 Hertz to a high of 10,375 Hertz, or 9,960 ± 415 Hertz. Thus, a measure of the value sin $\phi$ may now be derived directly from the output of filter 28 by moving switch 40 in FIG. 4 from the terminal 41 where it is placed for conventional omni-range operation to terminal 42. Now, the rectified signal produced in circuit 35 is proportional to sin $\phi$, which signal again appears directly on terminal 45 for supply to multiplier 9 of FIG. 2. Thus, by the simple operation of switch 40, the precision rectifier 35 is changed from the output of 30 Hertz filter 30 to the output of the 30 Hertz filter 28 in accordance with the type of omni-range transmissions being received, and the correct value of ground range R is displayed by meter 10 in both instances.

Figure 10:
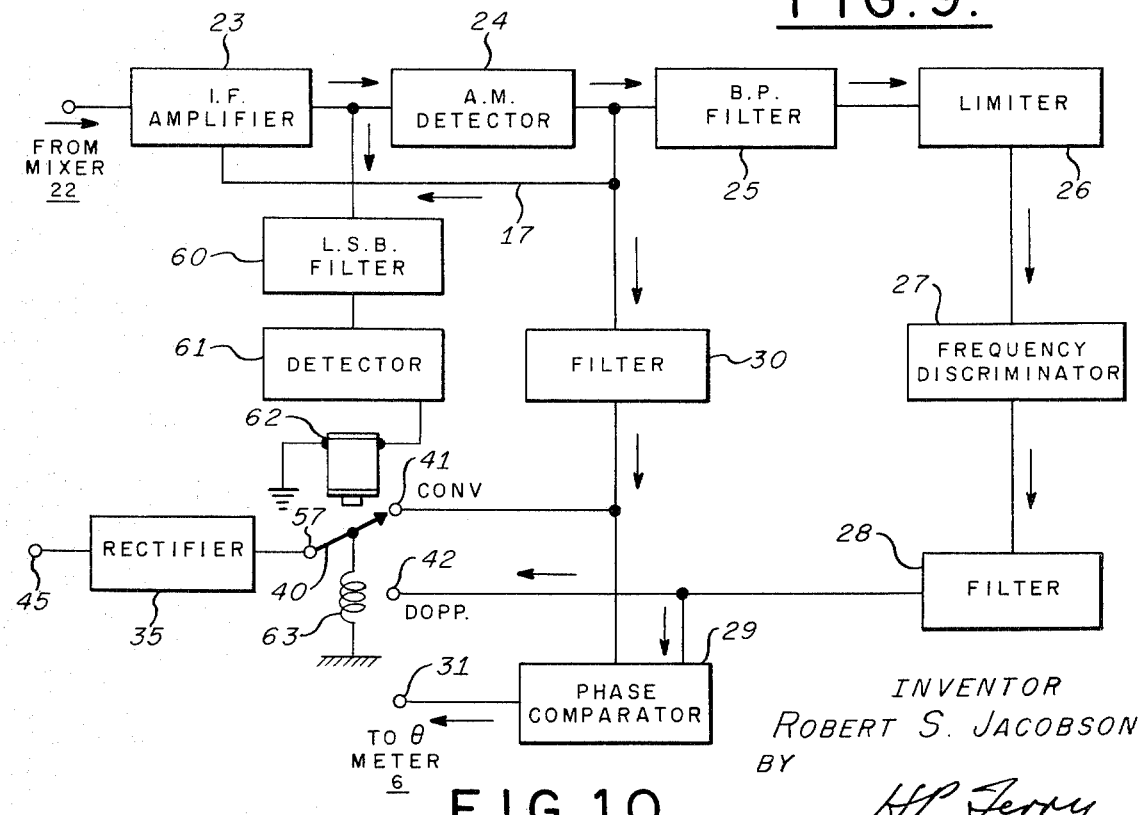
FIG. 10 is a block diagram of a navigation receiver alternative to that of FIG. 4.

FIG. 10 represents an alternative form of the invention which may be employed with Doppler navigation systems which are of the single side band type, rather than of the double side band kind. In FIG. 10, many parts are used that are the same as those used in FIG. 4 and corresponding parts therefore have similar reference numerals. For example, i.f. amplifier 23, a.m. detector 24, filter 25, limiter 26, discriminator 27, filter 28, comparator 29, filter 30, and rectifier 35 are common to both figures.

Referring again to page 168 of the aforementioned Kayton et al text, it is seen that the electrically commutated antenna complex of the Doppler omni-range transmitter system transmits only the upper side band 9,960 Hertz modulation components, that is, at a frequency of $f_0$ + 9,960 Hertz. The lower side band labeled "Lower Reference Signal" in FIG. 3 is not used. Thus, the lower side band ($f_0$ − 9960 Hertz) is not present in the received Doppler omni-range signals, whereas it is present in the conventional omni-range signals. Use is made of this distinction in operation of the apparatus of FIG. 10, where the output of i.f. amplifier 23 is coupled through filter 60 to detector circuit 61. Any output yielded by detector 61 is passed, for example, to relay 62 which, when such a signal is present, holds switch balde 40 in the position shown. In the absence of an input to relay 62, switch blade 40 is pulled downward by spring 63 to contact terminal 42.

Filter 60 at the output of i.f. amplifier 23 removes all frequency components except those due to the lower 9960 side band, which latter signal is passed to detector 61, causing actuation of relay 62. Accordingly, the output of filter 30 is fed to precision rectifier 35 for processing as previously described. When the receiver 4 is tuned to a Doppler omni-range transmitter station, there is no lower 9960 Hertz side band energy received; since filter 60 removes all other signals, detector 61 receives no input and relay 62 is not actuated. Accordingly, switch arm 40 is pulled by spring 63 to the contact 42 and the output of filter 28 is supplied to precision rectifier 35.

Accordingly, the invention is a radio navigation apparatus for accurate navigation of craft employing modifications of existing craft-borne radio navigation distance measuring and omni-range receiver systems for providing craft-borne display or other utilization of magnetic azimuth bearing data and actual ground range of a craft with respect to conventional ground guidance and navigation transmitters, thereby permitting accurate, reliable, and universal area navigation of the craft with respect to such guidance transmitters and their transmissions.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Area navigation apparatus responsive to fixed navigation transmitter means supplying omni-range and distance meansurement radiations, comprising:

craft-borne omni-range receiver means responsive to said omni-range radiations, craft-borne radio distance measurement receiver means responsive to said distance measurement radiations, rectifier means responsive to said omni-range receiver means, multiplier means responsive to said rectifier means and to said radio distance measurement receiver means for producing an output signal substantially proportional to ground range with respect to said navigation transmitter means, and means for utilizing said output signal substantially proportional to said ground range, said omni-range receiver means including:

receiver circuit means for providing a first audio output having a first characteristic phase, frequency discriminator means coupled to said receiver circuit means for providing a second audio output having a second characteristic phase, first and second band pass filter means respectively responsive to said first and second audio outputs, and switch means for selectively coupling said first or said second band pass filter means to said rectifier means.

2. Apparatus as described in claim 1 further including:

intermediate amplifier means within said receiver circuit means, side band filter means responsive to said intermediate amplifier means, and detector circuit means responsive to said side band filter means for controlling the conductivity of said switch means.

* * * * *